United States Patent [19]

Griffin, III et al.

[11] 4,010,012
[45] Mar. 1, 1977

[54] TOTAL GAS CONTAINMENT SYSTEM

[75] Inventors: Phil H. Griffin, III; William A. Rehm; Martin L. Talley; Martin J. Sharki; Woodrow E. Renfro, all of Houston, Tex.

[73] Assignee: Dresser Industries, Inc., Dallas, Tex.

[22] Filed: Feb. 3, 1975

[21] Appl. No.: 546,249

[52] U.S. Cl. .................................. 55/169; 55/189; 55/164

[51] Int. Cl.² ........................................ B01D 19/00

[58] Field of Search .......... 55/43, 46, 55, 160–164, 55/189, 193, 169

[56] References Cited

UNITED STATES PATENTS

| | | | |
|---|---|---|---|
| 2,869,673 | 1/1959 | Erwin | 55/192 |
| 3,517,487 | 6/1970 | Burnham, Sr. | 55/192 |
| 3,616,599 | 11/1971 | Burnham, Sr. | 55/41 |
| 3,633,687 | 1/1972 | West et al. | 73/200 |
| 3,898,061 | 8/1975 | Brunato | 55/193 |

*Primary Examiner*—Charles N. Hart
*Assistant Examiner*—Richard W. Burks
*Attorney, Agent, or Firm*—Eddie E. Scott

[57] ABSTRACT

A system is disclosed for removing gas from drilling mud without allowing the gas to escape to the atmosphere before the gas is treated to prevent contamination. The system includes a mud-gas separator vessel with a drilling mud inlet, means for maintaining a minimum mud level in said mud-gas separator vessel, a separator vessel gas outlet, and a separator vessel drilling mud outlet. A degassing means includes a drilling mud inlet located in a position higher than said minimum mud level. Enclosed conduit means connects the separator vessel drilling mud outlet to said degassing means drilling mud inlet.

8 Claims, 4 Drawing Figures

TOTAL GAS CONTAINMENT SYSTEM

BACKGROUND OF THE INVENTION

The present invention relates to a system for degassing fluids and, more particularly, to a system for removing gas from drilling mud without allowing said gas to escape to the atmosphere before the gas is treated to prevent contamination.

Under many circumstances, it is desirable and in fact often absolutely essential that gases be removed from drilling mud without allowing the gas to escape into the atmosphere. During the drilling of an oil well, the drilling mud that is circulated through the borehole frequently becomes contaminated with gases encountered in the formations. Since it is economically unfeasible to discard the contaminated drilling mud and because of the danger of the gases in the drilling mud escaping into the atmosphere creating dangerous conditions at the drill site, it is necessary to process the drilling mud to remove the gases and recirculate the degassed drilling mud through the borehole. The contaminating gases may be poisonous or highly explosive. The release of such gases into the atmosphere would present a substantial risk to personnel to the drilling area. The presence of gases in the drilling mud decreases its weight and viscosity and renders it unsuitable for recirculation through the borehole. When gases are contained in the drilling mud being circulated through the borehole, it increases the danger of a blowout in the well.

A "Notice to Lessees and Operators of Federal Oil and Gas Leases in the Outer Continental Shelf, Gulf of Mexico Area" was released May 7, 1974 by the United Stated Department of the Interior Geological Survey Gulf of Mexico area, relating to hydrogen sulfide in drilling operations. The notice outlines requirements for drilling operations when there is a possibility or probability of penetrating reservoirs known or expected to contain hydrogen sulfide. Section 3, f. provides that "drilling mud containing $H_2S$ gas shall be degassed at the optimum location for the particular rig configuration employed. The gases so removed shall be piped into a closed flare system and burned at a suitable remote stack."

It is desirable that any system for removing gas from drilling mud without allowing said gas to escape to the atmosphere contain alarms that will be actuated should conditions exceed a pre-determined level. The actuation of the alarms will allow proper procedures to be taken to correct the problem. The system must be totally enclosed and of a fail-safe design. The system must start at the wellhead and contain the gas within the system until it is treated at a flare or disposed of by other means. In order for the degassing system to operate effectively, it is essential that a partial vacuum be maintained in the degassing vessel at all times. In addition, controlled flow rates should be provided to the degassing vessel to insure efficient operation of the degassing system.

DESCRIPTION OF PRIOR ART

In U.S. Pat. No. 3,241,295 to P. H. Griffin III, et al, patented Mar. 22, 1956, a drilling mud degasser for oil wells is disclosed. The degasser includes the combination of a mud degasser vacuum tank having a mud inlet and a mud outlet for continuous flow of mud through the tank, means for maintaining the interior of said tank at sub-atmospheric pressure, valve means provided in said mud inlet for controlling the rate of flow of mud into the tank, means responsive to variations of level of mud in said tank for varying the sub-atmospheric pressure in the tank, and means responsive to variations of pressure in the tank for opening and closing said valve means.

In U.S. Pat. No. 3,362,136 to G. E. Burnham Sr., et al, patented Jan. 9, 1968, an apparatus for degassing fluids is shown. The degassing apparatus includes a tangential feed conduit for delivering mud through a flow-controlled elliptical valve onto a helical shelf. The shelf grows progressively narrower as it follows its spiral downward path around the inside wall of the vacuum tank to which it is affixed. The inside edge of the shelf is downwardly inclined at least 30° from horizontal to cause part of the mud to fall in a continuous curtain from said inside edge as the remainder of the mud progresses down the helical path to an upright, vortex-breaking deflector plate. Separated gases pass through a mist eliminator to a vacuum pump for discharge to atmosphere.

In U.S. Pat. No. 3,363,404 to P. H. Griffin III, et al, patented Jan. 16, 1968, a mud degasser is shown. The degasser includes a combination of a horizontally elongated vacuum tank having an inlet end and an outlet end, an intake pipe for gas cut mud extending into the inlet end of said tank, an outlet pipe for gas-free mud extending from the bottom portion of the tank outwardly through the outlet end thereof for recirculation of gas-free mud to a well, a vacuum pump, a suction line extending from said pump, a three-way vacuum control valve having a first port connected to said suction line, a second port, and port means communicating with the atmosphere, a suction pipe extending from said second port of said valve to the interior of said tank, a float buoyant on the level of mud in the bottom portion of the tank, and means operatively connecting said float to said control valve, whereby the valve may directly communicate said suction pipe to said suction line and pump to increase the vacuum in the tank when the mud level is falling and whereby the valve may communicate said suction pipe through said port means with the atmosphere to decrease the vacuum in the tank when the mud level rises.

In U.S. Pat. No. 3,517,487 to G. E. Burnham Sr., patented June 30, 1970, a drilling mud flow and divider apparatus is shown. The apparatus includes a vacuum tank having baffle means comprised of a stack of vertically spaced baffles with extending surfaces forming truncated cones with openings through the truncated portions and a single gas-laden mud delivery means feeding upwardly through said openings. The diameters of the openings decrease in size upwardly through the stack, so that a portion of the upflowing mud is blocked and diverted outwardly onto the upper surfaces of certain baffles to flow downwardly over said upper surfaces.

In U.S. Pat. No. 3,769,779 to W. E. Liljestrand, patented Nov. 6, 1973, a degassing apparatus is shown. The apparatus includes a vessel having an inlet and an outlet for the intake and discharge of the fluid to be treated, a centrifugal pump connected to the vessel for circulating the fluid through the vessel, and means for removing gas from the region of the impeller means in the centrifugal pump. The invention also includes a centrifugal pump designed for handling gas-laden fluids, the pump having a means for removing gas from the region of the pump impeller. The invention further includes a centrifugal pump for handling corrosive and/or abrasive fluids, wherein said fluids are prevented from contacting the pump seal by means of a gas pressurized compartment adjacent to the seal.

SUMMARY OF THE INVENTION

The present invention provides a system for removing gas from drilling mud without allowing the gas to escape to the atmosphere before treatment to prevent contamination. The system comprises a mud-gas separator vessel having a drilling mud inlet, means for maintaining a minimum mud level in the mud-gas separator vessel, a gas outlet, and a drilling mud outlet. A degassing means is provided, having a drilling mud inlet. The drilling mud inlet of the degassing means is located at a higher level than the minimum mud level in the mud-gas separator vessel. An enclosed conduit means connects the drilling mud outlet of the mud-gas separator vessel with the drilling mud inlet of the degassing means.

It is therefore an object of the present invention to provide a system for removing gas from drilling mud without allowing the gas to escape to the atmosphere.

If is a further object of the present invention to provide a system for removing gas from drilling mud without allowing said gas to escape to the atmosphere wherein a partial vacuum is maintained in a degassing means.

It is a still further object of the present invention to provide a system for removing gas from drilling mud without allowing said gas to escape to the atmosphere wherein controlled flow rates are provided to the degassing means.

The above objects and advantages of the present invention will become apparent upon consideration of the following detailed description of the invention, when taken in conjunction with the accompanying drawings.

DETAILED DESCRIPTION OF THE INVENTION

Figure 1:
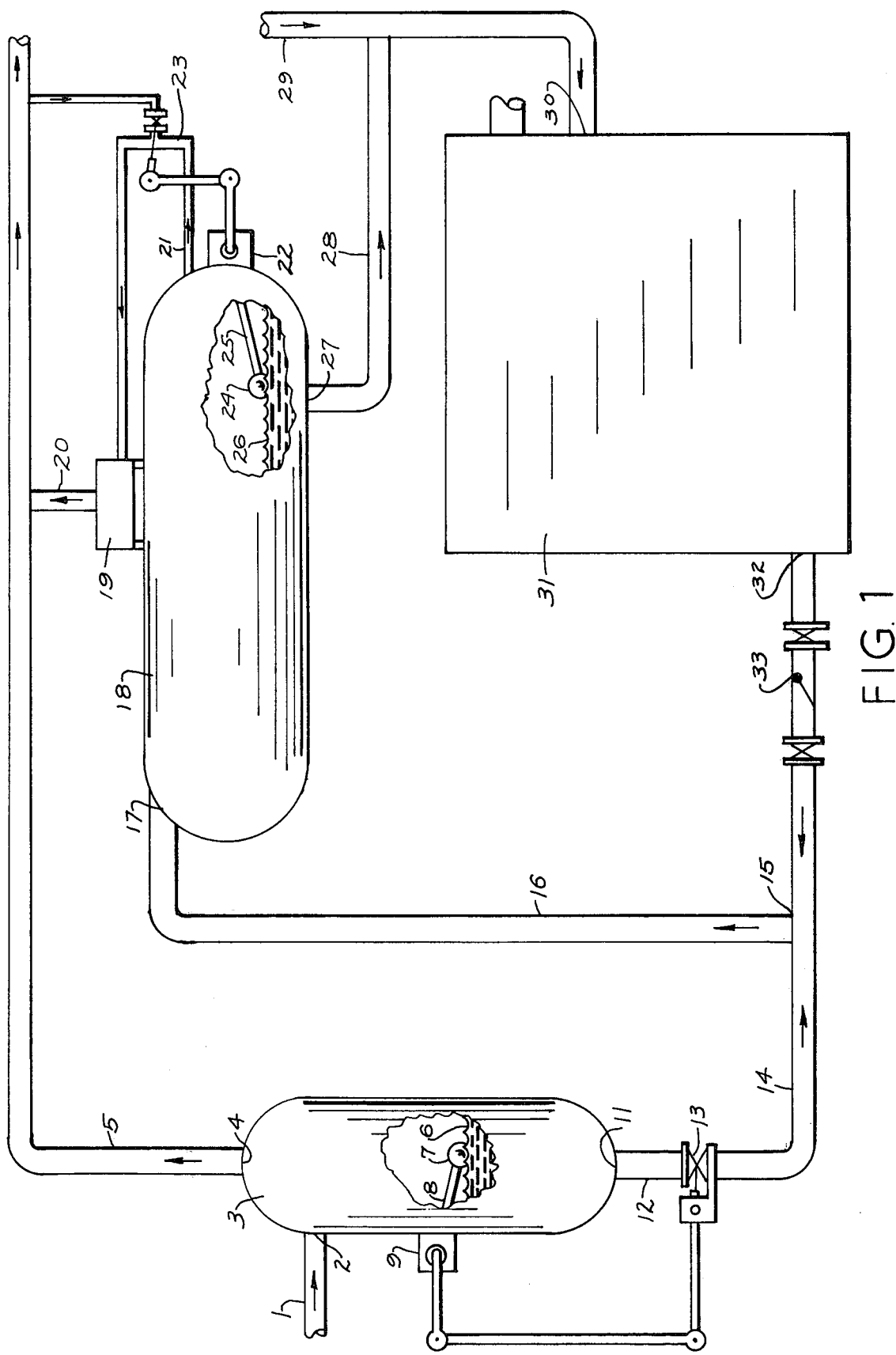
FIG. 1 illustrates a degassing system constructed in accordance with the present invention.

Referring now to the drawings and, in particular, to FIG. 1, a degassing system constructed in accordance with the present invention is illustrated. Drilling mud is directed to a mud-gas separator vessel 3 through line 1. The drilling mud enters the mud-gas separator vessel at drilling mud inlet 2. The mud-gas separator vessel 3 acts as a surge tank and gas knockout. Free gas escaping from the drilling mud is exhausted from the mud-gas separator vessel 3 to a flare line 5 through a gas outlet 4. The flare line 5 carries the gas to a remote point where it is burned or treated in some fashion to remove any objectionable components.

A minimum mud level 6 is maintained in the mud-gas separator vessel 3. The minimum mud level 6 is maintained by a valve 13 and connecting linkage from valve 13 that extends through a stuffing box 9 to a float rod 8 and float 7. The float 7 is connected to the stuffing box 9 by the float rod 8. The mud-gas separator vessel 3 has a mud outlet 11 and a mud outlet line 12 extending from mud outlet 11. The valve 13 is located in the mud outlet line 12. The connecting linkage connects valve 13 to rod 8 through the stuffing box 9. Changes in the mud level 6 cause the float 7 and rod 8 to move, thereby moving the connecting linkage and adjusting valve 13 to either increase or decrease drilling mud flow as necessary to maintain the minimum mud level 6.

Drilling mud passing through valve 13 enters line 14 and is transmitted to a T-junction 15 where it enters suction line 16 leading to a degassing vessel 18. The drilling mud enters the degassing vessel 18 through a drilling mud inlet 17. The drilling mud inlet 17 is located at a higher level than the minimum level 6 in the mud-gas separator vessel 3. This insures that a partial vacuum in the degassing vessel suction line 16 will be required to create flow of drilling mud from the mud-gas separator vessel 3 through drilling mud inlet 17 into the degassing vessel 18.

A vacuum pump unit 19 is positioned on or near the upper surface of degassing vessel 18 for maintaining a partial vacuum in the degassing vessel 18. Gas is exhausted from the degassing vessel 18 by pump unit 19 through exhaust line 21 from the degassing vessel to the pump unit and through exhaust line 20 extending from the pump unit 19 to the flare line 5. A near maximum mud level 26 is maintained in the degassing vessel 18 by a valve 23 that controls the vacuum applied to degassing vessel 18. A mechanical linkage extends from valve 23 to a float rod 25 and float 24 through a stuffing box 22. Changes in the mud level cause the float 24 and rod 25 to move, thereby moving the mechanical linkage and adjusting valve 23 to either increase or decrease the vacuum applied to degassing vessel 18 as necessary to maintain the near maximum mud level 26. A line from the flare line 5 to valve 23 allows exhaust gas to be admitted into vacuum unit 19 and into the degassing vessel 18 when the vacuum applied to degassing vessel 18 is to be decreased. This also will insure proper operation of vacuum pump unit 19.

Degassed mud is drawn from the degassing vessel 18 through a drilling mud outlet 27 below the operating mud level. The mud is carried through a line 28 and passes into a mud tank 31 through an inlet 30. A jet line 29 connected to line 28 assists in withdrawing the degassed mud from the degassing vessel 18.

An outlet 32 in mud tank 31 allows degassed drilling mud from mud tank 31 to be transitted through line 14 to T-junction 15 and drawn into degassing vessel 18 through suction line 16. A check valve 33 prevents gas-contaminated mud from entering mud tank 31 through mud outlet 32 and contaminating the degassed mud in mud tank 31. The provision of a source of gas-free mud to the suction line 16 and drilling mud inlet 17 of the degassing vessel 18 insures continuity of efficient operating conditions in the degassing vessel 18. The minimum mud level 6 of the mud-gas separator vessel 3 is maintained at a higher level than the maximum level of mud in the mud tank 31 to assure a preferential flow of mud from the mud-gas separator vessel 3 to the degassing vessel 18. This allows flow from the mud tank 31 through outlet 32, check valve 33, T-junction 15 and suction line 16 to the degassing vessel 18 only to supplement the preferential flow from mud-gas separator vessel 3 to maintain continuity of total flow volume rate to the degassing vessel 18.

The structural details of a degassing system constructed in accordance with the present invention having been described, the operation of the degassing system will now be considered with reference to FIG. 1. The present invention provides an effective, entirely enclosed system for safely and effectively removing dangerous gases from drilling mud from a source such as the mud return system of a well drilling operation and venting of the gases to a flare line burn at a safe distance from the drill site. The mud-gas separator vessel 3 vents free gases entering the system through line 1 to a flare line 5. The mud-gas separator vessel 3 discharges gas-contaminated drilling mud through outlet 11. The outlet 11 prevents the accumulation of solid debris in the mud-gas separator vessel 3. A minimum mud level 6 is maintained in the mud-gas separator vessel 3 at all times by a float 7 connected to a valve 13 in the outlet line 12 by a mechanical linkage.

The contaminated drilling mud is transmitted through line 14 to suction line 16 of degassing vessel 18. The inlet 17 of degassing vessel 18 is located at a height sufficiently above the normal operating levels of drilling mud in the mud-gas separator vessel 3 and the mud in mud tank 31 in order that the desired sub-atmospheric pressure in the degassing vessel 18 will be required to cause the desired rate of flow of mud into degassing vessel 18.

Degassed mud from mud tank 31 is provided to the suction line 16 of degassing vessel 18 through line 14. A check valve 33 in line 14 prevents contaminated mud from mud-gas separator vessel 3 from entering the mud tank 31 and contaminating the degassed mud therein. The mud-gas separator vessel 3 is positioned so that the minimum mud level 6 in mud-gas separator vessel 3 is a planned height above the maximum level of drilling mud in the mud tank 31, assuring a preferential flow of the contaminated mud from the mud-gas separator vessel to the degassing vessel 18. This allows flow from the mud tank 31 to the degassing vessel 18 only to supplement the preferential flow from mud-gas separator vessel 3 to maintain approximate continuity of total flow volume rate into the degassing vessel 18.

A vacuum pump 19 provides a sub-atmospheric pressure in the degassing vessel 18 by drawing gas through line 21 and discharging the gas through line 20 into flare line 5. A near maximum mud level 26 is maintained in the degassing vessel 18. Changes in mud level 26 cause the float 24 and rod 25 to move, thereby moving the mechanical linkage and adjusting valve 23 to either increase or decrease the vacuum applied to degassing vessel 18 as necessary to maintain the near maximum mud level 26. A line from the flare line 5 to valve 23 allows exhaust gases to be admitted through valve 23 when open to vacuum unit 19 and into degassing vessel 18. Degassed mud is withdrawn from the degassing vessel 18 through line 28 and discharged into mud tank 31. A source of pressure 29 is provided through a jet nozzle to assist in withdrawing the degassed mud from degassing vessel 18.

Figure 2:
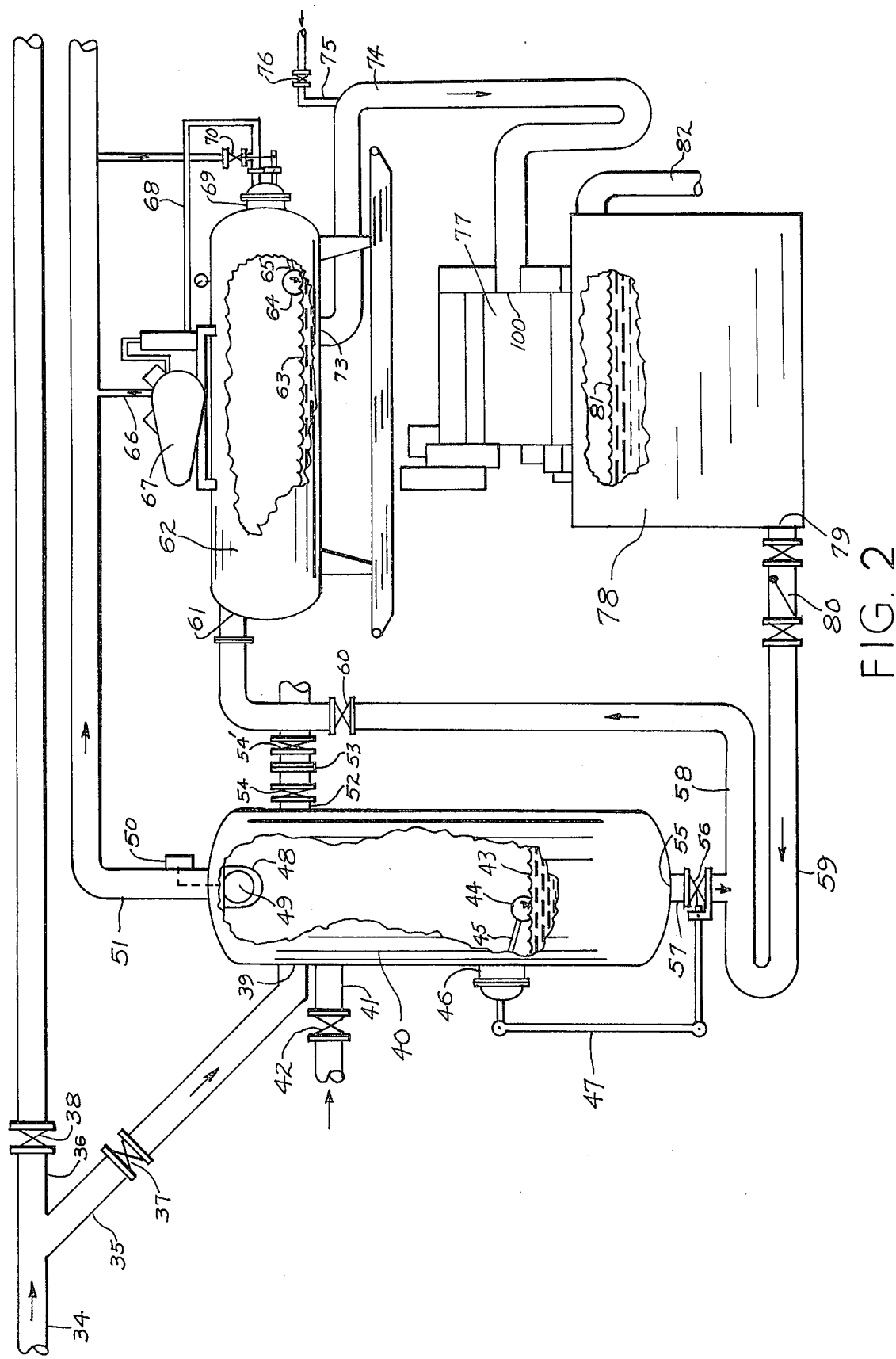
FIG. 2 illustrates another embodiment of a degassing system constructed in accordance with the present invention.

Referring now to FIG. 2, another embodiment of a degassing system constructed in accordance with the present invention is illustrated. Drilling mud from the well normally passes through flow line 34 and continues through line 36 and valve 38. Valve 37 in line 35 is normally closed. When drilling in known hydrogen sulfide-bearing areas, or when a dangerous gas such as hydrogen sulfide has been detected, the valve 38 in line 36 is closed, diverting the drilling mud into line 35. Valve 37 is opened, allowing the drilling mud to enter a mud-gas separator vessel 40 through drilling mud inlet 39. The mud-gas separator vessel 40 acts as a surge tank and gas knockout. Free gas entrained in the drilling mud is exhausted from the mud-gas separator vessel 40 to a flare line 51 through a gas outlet 48. The flare line 51 carries the gas to a remote point where it is burned or treated in some fashion to remove any objectionable components. Alternatively, the drilling mud may be directed to the separator vessel 40 from the choke manifold through line 41 and valve 42.

A float valve 49 is provided to prevent flow of drilling mud through flare line 51, should the entire mud-gas separator vessel 40 become filled with drilling mud. An alarm 50 is connected to the float valve 49 to signal an alarm, should the mud level in mud-gas separator vessel 40 rise to the point that float valve 49 is closed. Should conditions arise wherein drilling mud completely fills mud-gas separator vessel 40 closing valve 49 causing a pressure build-up in the mud-gas separator vessel 40, a fail-safe emergency bypass rupture disc 53 allows mud to be channelled to a safe location through line 52. Valves 54 and 54' are provided in the bypass line 52.

A minimum mud level 43 is maintained in the mud-gas separator vessel 40. The minimum mud level 43 is maintained by a valve 56 and connecting linkage 47 from valve 56 that extends through a stuffing box 46 to a float rod 45 and float 44. The float 44 is connected to linkage 47 through the stuffing box 46 by the float rod 45. The mud-gas separator vessel 40 has a mud outlet 55 and a mud outlet line 57 extending from the mud outlet 55. The valve 56 is located in the mud outlet line 57. Changes in minimum mud level 43 cause the float 44 the rod 45 to move, thereby moving the connecting linkage 47 and adjusting valve 56 to either increase or decrease drilling mud flow as necessary to maintain the minimum mud level 43.

Drilling mud passing through valve 56 is drawn through a suction line 58 to a degassing vessel 62. The drilling mud enters the degassing vessel 62 through a drilling mud inlet 61. The drilling mud inlet 61 is located at a higher level than the minimum mud level 43 in the mud-gas separator vessel 40 and higher than the expected operating mud level in mud-gas separator vessel 40. This insures that a partial vacuum in the degassing vessel suction line 58 will be required to create flow of drilling mud from the mud-gas separator vessel 40 through drilling mud inlet 61 into the degassing vessel 62. A degassing vessel suction control valve 60 is provided in the suction line 58.

A vacuum pump unit 67 is positioned on or near degassing vessel 62 for maintaining a partial vacuum in the degassing vessel 62. Gas is exhausted from the degassing vessel 62 through an exhaust line 68 extending from the degassing vessel 62 to the vacuum pump unit 67. Gas from vacuum pump unit 67 passes into the flare line 51 through line 66. A near maximum mud level 63 is maintained in the degassing vessel 62 by a modified three-way valve 70 in exhaust line 68 that controls the vacuum applied to degassing vessel 62. A mechanical linkage extends from the modified three-way valve 70 to a float rod 65 and float 64 through a stuffing box 69. Changes in the mud level cause the float 64 and rod 65 to move, thereby moving the mechanical linkage and adjusting the modified three-way valve 70 to either increase or decrease the vacuum applied to degassing vessel 62 as necessary to maintain the near maximum mud level 63. A line from the flare line 51 to the modified three-way valve 70 allows exhaust gas to be admitted into vacuum unit 67 and into degassing vessel 62 when the vacuum applied to degassing vessel 62 is to be decreased. This will also insure proper operation of the vacuum pump unit 67.

Degassed mud is drawn from the degassing vessel 62 through a drilling mud outlet below the mud level 63. The mud is carried through a line 74 and exits through outlet 100 onto a vibrating screen 77. The degassed and screened mud falls into mud tank 78. A jet line 75 connected to line 74 assists in withdrawing the degassed mud from the degassing vessel 62. The flow through jet line 75 may be controlled by a valve 76.

An overflow line 82 maintains a maximum mud level 81 in the mud tank 78. An outlet 79 in mud tank 78 allows degassed drilling mud from mud tank 78 to be transmitted through line 59 to suction line 58 and be drawn into degassing vessel 62. A check valve 80 in line 59 prevents contaminated mud from entering mud tank 78 through mud outlet 79. This prevents the degassed mud in mud tank 78 from being contaminated by mud from mud-gas separator vessel 40 that may contain objectionable gases.

The provision of a source of gas-free mud to suction line 58 and drilling mud inlet 61 of the degassing vessel 62 insures continuity of efficient operating conditions in the degassing vessel 62. The minimum mud level 43 of the mud-gas separator vessel 40 is maintained at a higher level than the maximum level 81 of mud in the mud tank 78 to assure a preferential flow of mud from the mud-gas separator vessel 40 to the degassing vessel 62. This allows flow from the mud tank 78 through outlet 79, check valve 80, line 59 and suction line 58 to the degassing vessel 62 only to supplement the preferential flow from mud-gas separator vessel 40 to maintain continuity of total flow volume rate to the degassing vessel 62.

Figure 3:
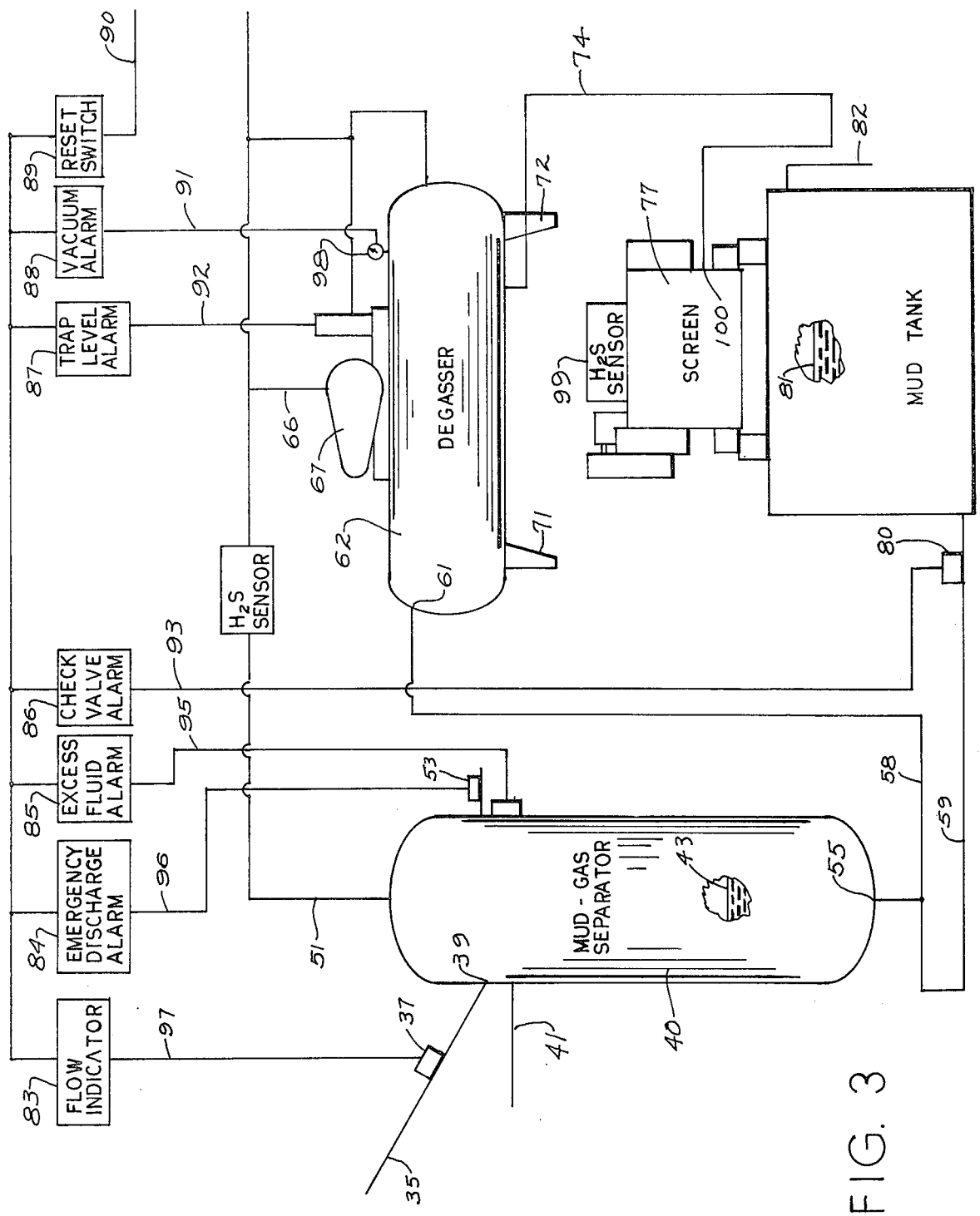
FIG. 3 is a schematic illustration of an alarm system of the degassing system shown in FIG. 2.

Referring now to FIG. 3, an alarm system of the degassing system shown in FIG. 2 is illustrated. A flow measuring device 37 is located in line 35 leading to the mud-gas separator vessel 40. An electrical conductor 97 connects the flow measuring device 37 to a flow indicator 83. The flow indicator 83 provides an indication of the volume rate of drilling mud entering mud-gas separator vessel 40.

An emergency discharge alarm 84 is connected to a pressure sensing device connected to rupture disc 53 by an electrical conductor 96. The emergency discharge alarm 84 will provide an indication should the level of mud in the mud-gas separator 40 rise to a level closing the float valve 49 in line 51 resulting in a pressure buildup in the emergency discharge line 52. In addition, an excess fluid alarm 85 is connected to a sensor in separator 40 by an electrical conductor 95 to provide an alarm when the fluid level rises to the level of the sensor.

A check valve alarm 86 is connected to the check valve 80 by an electrical conductor 93 to provide an alarm should there be flow through valve 80 toward the mud tank. A trap level alarm 87 is connected to the trap of vacuum pump unit 67 to provide an alarm should fluid begin building up in the liquid trap of vacuum pump unit 67. A vacuum alarm 88 is connected to a pressure gauge 98 on the degasser vessel 62 by an electrical conductor 91 to provide an alarm should the sub-atmospheric pressure in the degassing vessel 62 change beyond pre-determined limits. A line 90 connects the alarm system to a suitable electrical source. A reset switch 89 is provided in line 90 to allow the alarms to be reset when conditions have returned to normal. A $H_2S$ sensor is provided in the flare line 51 and a $H_2S$ sensor 99 is mounted on vibrating screen 77.

Figure 4:
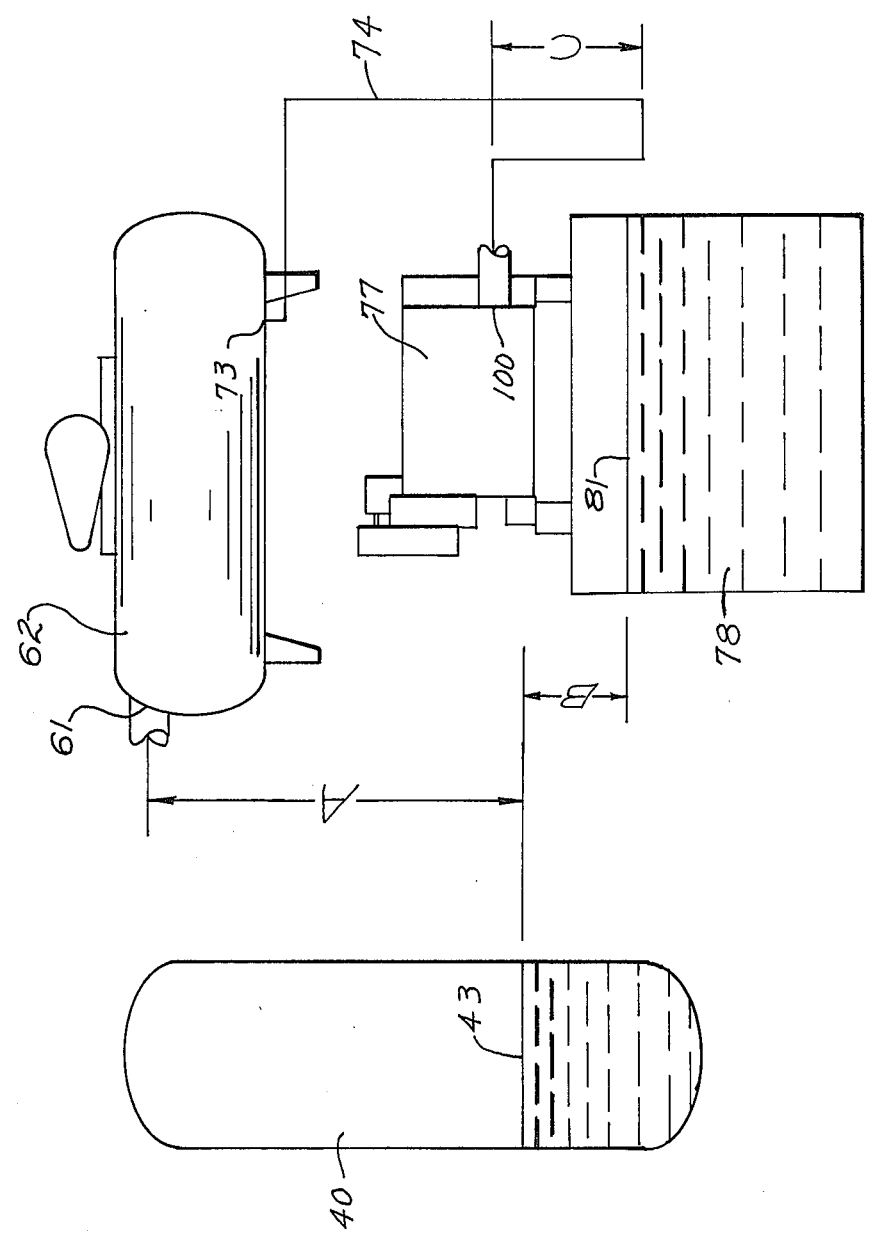
FIG. 4 illustrates height relationships of elements of the degassing system shown in FIG. 2.

Referring now to FIG. 4, various height relationships of elements of the degassing system shown in FIGS. 2 and 3 are illustrated. The inlet 61 in degassing vessel 62 is positioned at height A above the minimum mud level 43 in mud-gas separator vessel 40. This insures that a partial vacuum will be required to create flow of drilling mud from the mud-gas separator vessel 40 through the drilling mud inlet 61 into the degassing vessel 62. The height A is preferably within the range of 6–10 feet.

The minimum mud level 43 in the mud-gas separator vessel 40 is located at a height B above the maximum mud level 81 in the mud tank 78. This provides a preferential flow of mud from the mud-gas separator vessel 40 to the degassing vessel 62. Flow of mud from the mud tank 78 is provided only to supplement the preferential flow from the mud-gas separator vessel 40 to maintain continuity of total flow volume rate to the degassing vessel 62. The height B is preferably within the range of 0–2 feet.

A gas sealing "U-tube" is provided in the line 74 that extends from the outlet 73 in the degassing vessel 62 to the vibrating screen 77. The height C of the "U-tube" is preferably within the range of 1–6 feet.

The structural details of another embodiment of a degassing system constructed in accordance with the present invention having been described, the operation of the degassing system will now be considered with reference to FIGS. 2, 3 and 4. The present invention provides an effective, entirely enclosed system for safely and effectively removing dangerous gases from drilling mud from a source such as the mud return system of a well drilling operation and venting of the gases to a flare line burn at a safe distance from the drill site. The mud-gas separator vessel 40 vents free gases entering the system through flare line 51. The mud-gas separator vessel 40 discharges contaminated drilling mud through the bottom position of outlet 55. The outlet 55 prevents the accumulation of solid debris in the mud-gas separator vessel 40. A minimum mud level 43 is maintained in the mud-gas separator vessel 40 at all times by a float 44 connected to a valve 56 in the outlet line 57 by a mechanical linkage 47 and rod 45.

Should the entire mud-gas separator vessel 40 become filled with drilling mud, the float valve 49 will close, preventing drilling mud from flowing through flare line 51. The alarm 50 connected to the float valve 49 will sound an alarm indicating that the mud-gas separator vessel has become filled with drilling mud. If pressure builds up sufficiently in the mud-gas separator vessel 40, the emergency bypass rupture disc fails, allowing mud to be channeled to a safe location through line 52. Valves 54 and 54' are provided in the line 52 to allow replacement of the bypass rupture disc 53.

The contaminated drilling mud from mud-gas separator vessel 40 is transmitted through line 57 to suction line 58 of degassing vessel 62. The inlet 61 of degassing vessel 62 is located at a height sufficiently above the normal operating levels of drilling mud in the mud-gas separator vessel 40 and the mud in mud tank 78 in order that the desired sub-atmospheric pressure in the degassing vessel 62 will be required to cause flow of mud into degassing vessel 62.

Degassed mud from mud tank 78 is channeled to the suction line 58 of degassing vessel 62 through line 59. The check valve 80 in line 59 prevents contaminated mud from mud-gas separator vessel 40 from entering the mud tank 78 and contaminating the degassed mud therein. The mud-gas separator vessel 40 is positioned so that the minimum mud level 43 in mud-gas separator vessel 40 is a planned height above the maximum level of drilling mud in the mud tank 78, assuring a preferential flow of the contaminated mud from the mud-gas separator vessel 40 to the degassing vessel 62. This allows flow from the mud tank 78 to the degassing vessel 62 only to supplement the preferential flow from mud-gas separator vessel 40 to maintain continuity of total volume flow into the degassing vessel 62.

The vacuum pump 67 provides a sub-atmospheric pressure in the degassing vessel 62 by drawing gas through line 68 and discharging the gas into the flare line 51 through line 66. A near maximum mud level 63 is maintained in the degassing vessel 62. Changes in mud level cause the float 64 and rod 65 to move, thereby moving the mechanical linkage and adjusting the modified three-way valve 70 to either increase or decrease the vacuum applied to degassing vessel 62 as necessary to maintain the minimum mud level 63. In order to maintain sufficient operation of the vacuum pump unit 67 and to prevent excessively low pressure in degassing vessel 62, a line from the flare line 51 to the valve 70 allows exhaust gases to be admitted into the vacuum pump unit 67 and into degassing vessel 62. Degassed mud is withdrawn from the degassing vessel 62 through outlet 73 and line 74. The mud is discharged through outlet 100 onto vibrating screen 77. A source of pressure from jet line 75 is provided to assist in withdrawing the degassed mud from degassing vessel 62. The mud passing through vibrating screen 77 falls into mud tank 78.

The embodiments of the invention in which an exclusive property or privilege is claimed are defined as follows:

1. A system for removing gas from drilling mud without allowing said gas to escape to the atmosphere before treatment to prevent contamination, comprising:
   an enclosed mud-gas separator vessel;
   a drilling mud inlet in said mud-gas separator vessel;
   means for maintaining a minimum mud level in said mud-gas separator vessel;
   a separator vessel gas outlet in said mud-gas separator vessel;
   a separator vessel drilling mud outlet in said mud-gas separator vessel;
   degassing means;
   a degassing means drilling mud inlet in said degassing means, said degassing means drilling mud inlet located higher than said minimum mud level; and
   enclosed conduit means connecting said separator vessel drilling mud outlet to said degassing means drilling mud inlet thereby preventing said gas from escaping to the atmosphere.

2. A system for removing gas from drilling mud without allowing said gas to escape to the atmosphere, comprising:
   an enclosed mud-gas separator vessel;
   a drilling mud inlet in said mud-gas separator vessel;
   means for maintaining a minimum mud level in said mud-gas separator vessel;
   a separator vessel gas outlet in said mud-gas separator vessel above said mud level;
   a separator vessel drilling mud outlet in said mud-gas separator vessel below said mud level;
   degassing means;
   a degassing means drilling mud inlet in said degassing means, said degassing means drilling mud inlet located higher than said minimum mud level; and
   enclosed conduit means connecting said separator vessel drilling mud outlet to said degassing means drilling mud inlet thereby preventing said gas from escaping to the atmosphere.

3. A system for removing gas from drilling mud without allowing said gas to escape to the atmosphere before treatment to prevent contamination, comprising:
   an enclosed mud-gas separator vessel;
   a drilling mud inlet in said mud-gas separator vessel;
   means for maintaining a minimum mud level in said mud-gas separator vessel;
   a separator vessel drilling mud outlet in said mud-gas separator vessel below said minimum mud level;
   a degassing means;
   a degassing means drilling mud inlet in said degassing means;
   enclosed conduit means connecting said separator vessel drilling mud outlet to said degassing means drilling mud inlet thereby preventing said gas from escaping to the atmosphere;
   means for maintaining a maximum mud level in said degassing means; and
   a degassing means drilling mud outlet in said degassing means for allowing drilling mud to be removed from said degassing means.

4. A system for removing gas from drilling mud without allowing said gas to escape to the atmosphere, comprising:
   an enclosed mud-gas separator vessel;
   a drilling mud inlet in said mud-gas separator vessel;
   means for maintaining a minimum mud level in said mud-gas separator vessel;
   a separator vessel drilling mud outlet in said mud-gas separator vessel below said minimum mud level;
   a degassing means;
   a degassing means drilling mud inlet in said degassing means;
   enclosed conduit means connecting said separator vessel drilling mud outlet to said degassing means drilling mud inlet;
   means for maintaining a near maximum mud level in said degassing means, said means including a source of gas to relieve excessive vacuum, a conduit from said source of gas to said degassing means, and valve means for controlling flow of gas through said conduit;
   means for maintaining general continuity of mud flow rate to said degassing means, said means including a source of gas-free mud, a conduit from said source of gas-free mud to said degassing means, and means for allowing flow of mud from said source of gas-free mud to said degassing means but preventing flow into said source of gas-free mud;
   a degassing means drilling mud outlet in said degassing means;
   a mud tank; and
   conduit means for transmitting drilling mud from said degassing means drilling mud outlet to said mud tank.

5. A system for removing gas from drilling mud without allowing said gas to escape to the atmosphere, comprising:
an enclosed mud-gas separator vessel;
a drilling mud inlet in said mud-gas separator vessel;
means for maintaining a minimum mud level in said mud-gas separator vessel;
a separator vessel as outlet in said mud-gas separator vessel above said minimum mud level;
a separator vessel drilling mud outlet in said mud-gas separator vessel below said minimum mud level;
a degassing vessel;
a degassing vessel drilling mud inlet in said degassing vessel, said degassing vessel drilling mud inlet located higher than said minimum mud level;
enclosed conduit means connecting said separator vessel mud drilling outlet to said degassing vessel drilling mud inlet;
means for maintaining a near maximum mud level in said degassing means, said means including a source of gas to relieve excessive vacuum, a conduit from said source of gas to said degassing means, and valve means for controlling flow of gas through said conduit;
means for maintaining general continuity of mud flow rate to said degassing means, said means including a source of gas-free mud, a conduit from said source of gas-free mud to said degassing means, and means for allowing flow of mud from said source of gas-free mud to said degassing means but preventing flow into said source of gas-free mud;
a degassing vessel gas outlet in said degassing vessel above said near maximum mud level in said degassing vessel;
a degassing vessel drilling mud outlet in said degassing vessel; and
conduit means for transmitting drilling mud from said degassing vessel drilling mud outlet to said gas-free mud source.

6. A system for removing gas from drilling mud without allowing said gas to escape to the atmosphere, comprising:
an enclosed mud-gas separator vessel;
a drilling mud inlet in said mud-gas separator vessel;
means for maintaining a minimum mud level in said mud-gas separator vessel;
a separator vessel gas outlet in said mud-gas separator vessel above said minimum mud level;
gas conduit means connected to said separator vessel gas outlet for transmitting said gas to a flare;
a separator vessel drilling mud outlet in said mud-gas separator vessel below said minimum mud level;
a degassing vessel;
a degassing vessel drilling mud inlet in said degassing vessel, said degassing vessel drilling mud inlet located higher than said minimum mud level;
enclosed conduit means connecting said separator vessel mud drilling outlet to said degassing vessel drilling mud inlet;
means for maintaining a near maximum mud level in said degassing means, said means including a source of gas to relieve excessive vacuum, a conduit from said source of gas to said degassing means, and valve means for controlling flow of gas through said conduit;
means for maintaining general continuity of mud flow rate to said degassing means, sid means including a source of gas-free mud, a conduit from said source of gas-free mud to said degassing means, and means for allowing flow of mud from said source of gas-free mud to said degassing means but preventing flow into said source of gas-free mud;
a degassing vessel gas outlet in said degassing vessel above said mud level;
a conduit connecting said degassing vessel gas outlet to said gas conduit means;
a degassing vessel drilling mud outlet in said degassing vessel; and
conduit means for transmitting drilling mud from said degassing vessel drilling mud outlet to said mud tank.

7. A system for removing gas from drilling mud and transmitting the gas to a flare without allowing said gas to escape to the atmosphere, comprising:
an enclosed mud-gas separator vessel;
a drilling mud inlet in said mud-gas separator vessel;
means for maintaining a minimum mud level in said mud-gas separator vessel;
a separator vessel gas outlet in said mud-gas separator vessel above said minimum mud level;
a first enclosed gas conduit means for transmitting said gas from said separator vessel gas outlet to said flare;
a separator vessel drilling mud outlet in said mud-gas separator vessel below said mud level;
a degassing vessel;
a degassing vessel drilling mud inlet in said degassing vessel, said inlet located above said minimum mud level;
a second enclosed conduit means connecting said separator vessel drilling mud outlet to said degassing vessel drilling mud inlet;
a degassing vessel gas outlet in said degassing vessel;
a third enclosed gas conduit means connected to said degassing vessel gas outlet for transmitting gas from said degassing vessel gas outlet to said flare;
vacuum means connected to said third enclosed gas conduit means for creating a vacuum in said degassing vessel;
a fourth enclosed gas conduit means communicating between said first enclosed gas conduit means and said third enclosed gas conduit means;
means for maintaining a near maximum mud level in said degassing means, said means including valve means in said fourth enclosed gas conduit means for controlling flow of gas through said conduit;
means for maintaining general continuity of mud flow rate to said degassing means, said means including a source of gas-free mud, a fifth conduit means from said source of gas-free mud to said degassing means, and means for allowing flow of mud from said source of gas-free mud to said degassing means but preventing flow into said source of gas-free mud;
a degassing vessel drilling mud outlet in said degassing vessel;
a mud tank; and
sixth conduit means for transmitting drilling mud from said degassing vessel drilling mud outlet to said mud tank.

8. A system for removing gas from drilling mud and transmitting the gas to a flare without allowing said gas to escape to the atmosphere, comprising:
an enclosed mud-gas separator vessel;

a drilling mud inlet in said mud-gas separator vessel;

means for maintaining a minimum mud level in said mud-gas separator vessel;

a separator vessel gas outlet in said mud-gas separator vessel above said minimum mud level;

a first enclosed conduit means for transmitting said gas from said separator vessel gas outlet to said flare;

a separator vessel drilling mud outlet in said mud-gas separator vessel below said mud level;

a degassing vessel;

a degassing vessel drilling mud inlet in said degassing vessel, said inlet located above said minimum mud level;

a second enclosed conduit means connecting said separator vessel drilling mud outlet to said degassing vessel drilling mud inlet;

a degassing vessel gas outlet in said degassing vessel;

a third enclosed conduit means for transmitting gas from said degassing vessel gas outlet to said first enclosed conduit means and to said flare;

vacuum means connected to said third enclosed conduit means for creating a vacuum in said degassing vessel;

means for maintaining a near maximum mud level in said degassing means, said means including fourth conduit means connected to said first enclosed conduit means and said third enclosed conduit means, and valve means in said fourth conduit means for controlling flow of gas through said fourth conduit means;

means for maintaining general continuity of mud flow rate to said degassing means, said means including a mud tank, a fifth conduit means from said mud tank to said second enclosed conduit means and means for allowing flow in said fifth conduit means from said mud tank to said second enclosed conduit means but preventing flow of mud in said fifth conduit means from said second enclosed conduit means to said mud tank;

a degassing vessel drilling mud outlet in said degassing vessel; and a sixth conduit means for transmitting drilling mud from said degassing vessel drilling mud outlet to said mud tank.

* * * * *

UNITED STATES PATENT OFFICE
CERTIFICATE OF CORRECTION

Patent No. 4,010,012      Dated March 1, 1977

Inventor(s) Phil H. Griffin, III et al.

It is certified that error appears in the above-identified patent and that said Letters Patent are hereby corrected as shown below:

Column 11, line 8, "as" should read --- gas ---.

Column 11, line 68, "sid" should read --- said ---.

Signed and Sealed this

Twenty-sixth Day of April 1977

[SEAL]

Attest:

RUTH C. MASON
Attesting Officer

C. MARSHALL DANN
Commissioner of Patents and Trademarks